United States Patent [19]

Stossberg et al.

[11] 4,161,134

[45] Jul. 17, 1979

[54] FLUID PRESSURE CIRCUIT FOR PERIODIC OPERATION OF FLUID PRESSURE OPERABLE DRIVE MEANS

[75] Inventors: Udo Stossberg, Gehrden; Josef Frania, Hanover; Hans F. Meyer, Gehrden; Alfrons Kneuttinger, Munich, all of Fed. Rep. of Germany

[73] Assignee: WABCO Westinghouse GmbH, Hanover, Fed. Rep. of Germany

[21] Appl. No.: 820,511

[22] Filed: Aug. 1, 1977

[30] Foreign Application Priority Data

Nov. 20, 1976 [DE] Fed. Rep. of Germany ....... 2652902

[51] Int. Cl.² .................. F01L 25/06; F01L 31/00
[52] U.S. Cl. ............................... 91/219; 91/290
[58] Field of Search .......................... 91/219, 290

[56] References Cited

U.S. PATENT DOCUMENTS

| 2,108,354 | 2/1938 | Swanson | 91/219 |
| 3,334,547 | 8/1967 | Grundmann | 91/219 |
| 3,529,512 | 9/1970 | Jones, Jr. | 91/219 |

FOREIGN PATENT DOCUMENTS 379979  9/1932  United Kingdom ..................... 91/219

Primary Examiner—Paul E. Maslousky
Attorney, Agent, or Firm—R. S. Visk; R. W. McIntire, Jr.

[57] ABSTRACT

A fluid pressure control circuit for periodic operation of fluid pressure operable drives or motors of the type such as used for windshield-wipers as well as for fluid pressure operable pulsating drives having a double-acting operating cylinder and wiper motor, and an associated control piston.

4 Claims, 1 Drawing Figure

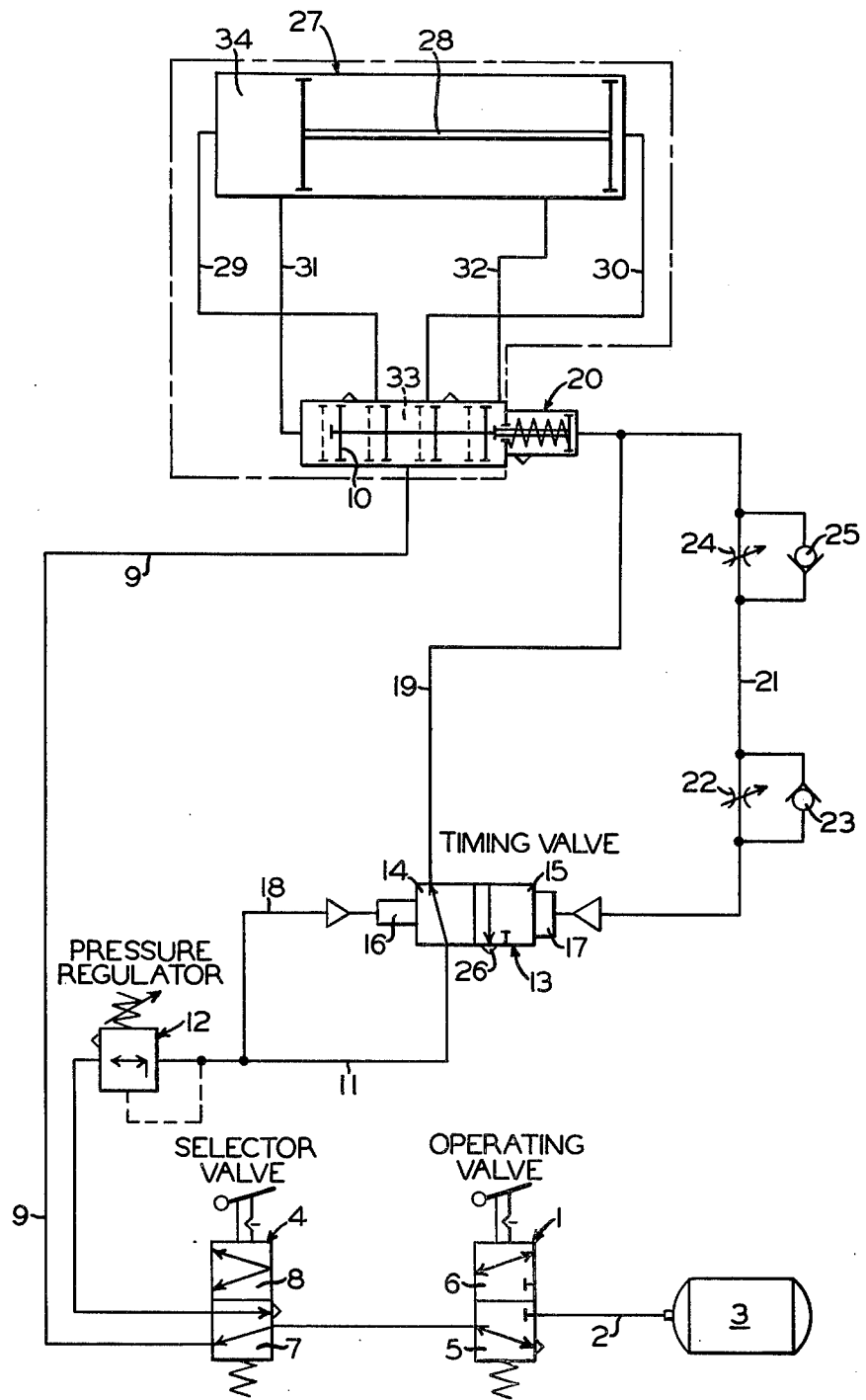

FLUID PRESSURE CIRCUIT FOR PERIODIC OPERATION OF FLUID PRESSURE OPERABLE DRIVE MEANS

BACKGROUND OF THE INVENTION

In the case of such circuit arrangements, it is necessary to produce pneumatic pulsations for the control of double-acting operating cylinders at certain, adjustable periodic time intervals. For this purpose, there are certain presently known control systems for effecting periodic operation of fluid pressure windshield-wiper drives, for example, which include a piston motor, a reversing valve for alternating the air pressure on the double piston of the motor, and an operating valve for connecting and disconnecting the reversing valve with or from a fluid pressure source, in which case the periodic operation is controlled as a function of the length of travel of the wiper.

Disadvantages experienced with these known windshield-wiper drives with periodic operation are the starting and reversing difficulties at the end of travel position as in the case of a relatively small wiping angle, for instance, caused by compressed snow accumulations on the windshield of a vehicle.

SUMMARY OF THE INVENTION

The object of the present invention is to provide a circuit arrangement for periodic operation of fluid pressure operable windshield-wiper drives which stops the respective drive at controllable time intervals by means of fluid pressure pulsations and effects restarting in a timely manner as a function of the fluid pressure pulsations, each pulsation being delayed sufficiently in a controllably throttled manner to permit the drive mechanism to fully recover from the previous stroke of operation.

This object is attained, according to the invention, by having a control piston device associated with a stop cylinder device connected with a pulsating valve device which, by means of adjustable air-release and air-admission throttles (in the form of chokes) interposed serially in a control pressure line, controls, in rhythmic time intervals, itself and the control piston device, as well as, in similar manner, one-way check valves also interposed in said control pressure line in parallel relation to the throttles, respectively, with flow therethrough in opposite directions. The advantages of the invention residing particularly in the exclusive time delayed periodic operation, avoids starting difficulties, especially in the event of an unintentional reduced wiping angle or travel of the drive, while ensuring intervals which can be adjusted and maintained with exact timing.

The single FIGURE drawing is a schematic view of an exemplified embodiment of the invention as further described hereinafter.

DESCRIPTION AND OPERATION

As shown in the drawing, the invention comprises an operating valve device 1 interposed serially in a fluid pressure supply pipe 2 between a source of fluid under pressure 3 and a selector valve device 4. When operating valve device 1 is in a closed position, in which it is shown, a pressure-off portion 5 of said operating valve device cuts off communication between pressure source 3 and selector valve device 4, said operating valve device being pedally operable to an open position in which a pressure-on portion 6 thereof establishes said communication. Selector valve device 4, which comprises a continuous operation portion 7 and an interval timing portion 8, is serially interposed in supply pipe 2 following operating valve device 1. When selector valve device 4 is in a continuous operation position, in which it is shown, the continuous operation portion 7 establishes a connection between pressure supply pipe 2 and a first control pressure pipe 9 which leads to a control valve device 10. When selector valve device 4 is pedally operated to a time interval position, the interval timing portion 8 thereof establishes concurrent connection of supply pipe 2 with both first control pipe 9 and a second control pipe 11.

A pressure regulator 12 is serially interposed in the second control pipe 11 between selector valve device 4 and a timing valve device 13 for the purpose of maintaining the pressure of fluid in the subsequent control lines at a constant pressure. Timing valve device 13 comprises a pressure admission portion 14 and a pressure release portion 15. Switching operation of timing valve device 13 is effected by a pair of opposingly arranged pistons 16 and 17, the latter having a larger effective pressure area than the former. The smaller piston 16 is constantly subjected to pressure in the second control pipe 11 via a first branch control pipe 18. A second branch control pipe 19 is connectable with the second control pipe 11 via the pressure admission portion 14 of the timing valve device 13 and also connects with a stop cylinder device 20 through a third branch pipe 21 which also leads to the larger area piston 17. The stop cylinder device 20 is operably associated with control valve device 10.

The third branch control pipe 21 leading to the larger piston 17 has interposed therein, in serial relation, a pressure release throttle or choke 22 with a one-way check valve 23 disposed in parallel relation thereto, the flow of said one-way check valve being, as indicated, in a direction toward said larger piston. Also interposed in pipe 21 following choke 22 is a pressure admission throttle or choke 24 with a one-way check valve 25 disposed in parallel relation thereto, the flow of said one-way check valve being in a direction toward control pipe 19. The timing valve device 13 is provided with a vent port 26 through which pressure is released from control pipe 19 when release portion 15 is operated to a release position in which said control pipe is communicated with said vent port.

A windshield-wiper motor 27 represents a commercially available fluid pressure operable motor with a double-acting operating piston 28. The wiper motor 27 is connected with the control valve device 10 by way of two wiper operating pipes 29 and 30, as well as by way of two wiper control pipes 31 and 32, in such a manner that shortly before operating piston 28 reaches the respective travel end positions, a reversal of travel in the opposite direction takes place.

In operation, when fluid pressure is admitted into the stop cylinder 20, control valve device 10 is operated to a holding position opposite said stop cylinder device and is securely retained in this position as long as fluid pressure prevails in said stop cylinder device, so that during this time a reversal of operating piston 28 cannot take place, and the wiper motor 27 remains or hesitates in a corresponding stationary position. When fluid pressure is supplied to the stop cylinder device 20 via pipe 19 at rhythmical time intervals (when timing valve device 13 is operated to a supply position in which it is shown in the drawing) the wiper motor runs accordingly as determined by the resultant interval operation, with the operating piston 28 hesitating for a predetermined time interval at the end of each stroke of travel.

The fluid pressure pulsations effecting the periods of hesitation are limited in time in accordance with the requirements of the apparatus. Supply and release of fluid pressure to and from the stop cylinder device 20 is effected by cooperative action of timing device 13, the pressure release throttle or choke 22, pressure admission throttle or choke 24 as well as check valves 23 and 25. Pressure regulator 12 ensures that pressure delivered to timing valve device 13 remains constant in the event of supply pressure variations and, in any case, to ensure uniform time intervals of operation of operating piston 28 corresponding to the times as set.

Timing device 13 is operated to its supply position, as shown in the drawing and in which smaller piston 16 is acted upon by the supply pressure, when the pressure-on portion 6 of operating valve 1 and the interval timing portion 8 of selector valve device 4 are operated to the open position (above described) and to the time interval position (above described), respectively. Timing valve device 13 allows the fluid pressure thus supplied to flow into control pipe 19, so that such pressure is first admitted to the stop cylinder device 20, thereby causing the control valve device 10 to be blocked in a left-hand position shown in broken lines. The wiper motor remains in a corresponding right-hand travel end position, since fluid pressure flows via pipe 9, a supply chamber 33, and operating pipe 29 to a left-hand operating chamber 34 of wiper motor 27.

As fluid pressure is being supplied to stop cylinder device 20, pressure is being built up simultaneously on the larger piston 17 of timing valve device 13 via the control pipes 19 and 21 as restricted by choke 24. After a predetermined delay (caused by said choke), sufficient pressure is built up on the larger piston 17 to produce a force sufficient for overcoming that of smaller piston 16 and thereby causing operation of timing valve device 13 from its supply position (through portion 14) to its release position (through portion 17) which, in turn, results in air being released from the stop cylinder device 20 via pipe 19 and vent port 26, starting up of the wiper motor 27 again.

Since, however, control pipes 19 and 21 are directly connected with each other, release of pressure from stop cylinder device 20 via pressure release portion 15 also causes a gradual drop in the pressure acting on the larger piston 17 at a restricted rate according to the setting of release choke 22, until the supply pressure on the smaller piston 16 of timing valve device 13 exerts a force on said valve device which is greater than the opposing force resulting from the residual pressure on the larger piston 17. A force acting on smaller piston 16 and greater than the force acting on the larger piston 17 results again in shifting of timing valve device 13 from its release position (through portion 17) to its supply position (through portion 14) and in resultant control processes already described above.

The running time of wiper motor 27 can be set by means of release choke 22 irrespective of the time during which the wiper motor remains in the stationary position which is set by means of the admission choke 24.

It is possible to set the release choke 22 and the admission choke 24 independently of one another, because, when pressure is released from control pipe 21 via said release choke, the admission choke 24 is bypassed by means of the one-way check valve 25 which opens in the direction of control pipe 19, and because, similarly, when pressure is admitted into control pipe 21 via admission choke 24, the release choke 22 is bypassed by means of the one-way check valve 23 which opens in the direction of the larger piston 17.

Having now described the invention, what I claim as new and desire to secure by Letters Patent, is:

1. A fluid pressure control circuit for controlling operation of reciprocable motor means, such as a windshield wiper motor having double-acting piston means operable responsively to supply and release, alternately, of fluid pressure for effecting reciprocal operation of said operating piston means, said control circuit comprising:
   (a) a source of fluid under pressure;
   (b) stop cylinder means operably connected to said control valve means and effective, when subjected to fluid pressure, for holding said control valve means in a stationary position until relieved of said fluid pressure acting thereon;
   (c) timing valve means including opposingly arranged actuating pistons having different pressure areas, a smaller of which is constantly subjected to actuating fluid pressure for biasing the timing valve means toward a supply position, in which said stop cylinder means is subjected to fluid pressure, and a larger of said pressure areas being alternately subjected to and relieved of actuating pressure for effecting alternate operation of said timing valve means between said supply position and a pressure release position in which said stop cylinder means is relieved of fluid pressure, according to predetermined rhythmical time intervals; and
   (d) throttling valve means comprising a pair of pre-set flow capacity chokes interposed in serial relation with each other between said stop cylinder means and the larger of said pressure areas, and a pair of one-way check valves arranged in parallel relation with said chokes, respectively, with the direction of flow of one of said check valves being toward said larger pressure areas and the direction of flow of the other check valve being opposite to said one.

2. A fluid pressure control circuit, as set forth in claim 1, further characterized by a fluid pressure regulator device operably interposed between said source and said timing valve means for ensuring supply of fluid to said timing valve means at a constant pre-set pressure and consequently uniform time intervals.

3. A fluid pressure control circuit, as set forth in claim 1, further characterized by a selector valve device interposed between said source of fluid under pressure and said control valve means, and having a continuous operation position in which said source is connected directly to said control valve means via which operating fluid pressure is supplied for operating said piston means.

4. A fluid pressure control circuit, as set forth in claim 3, wherein said selector valve means is operable to a time interval position in which said source of fluid under pressure is connected simultaneously to said control valve means and to said fluid pressure regulator device.

* * * * *